(12) United States Patent
Niedens et al.

(10) Patent No.: US 10,508,593 B2
(45) Date of Patent: Dec. 17, 2019

(54) CONTROL ARRANGEMENT OF AN EXHAUST-GAS TURBOCHARGER

(71) Applicant: BorgWarner Inc., Auburn Hills, MI (US)

(72) Inventors: Johann Niedens, Kaiserslautern (DE); Ingo Dietrich, Gruenstadt (DE)

(73) Assignee: BorgWarner Inc., Auburn Hills, MI (US)

( * ) Notice: Subject to any disclaimer, the term of this patent is extended or adjusted under 35 U.S.C. 154(b) by 1029 days.

(21) Appl. No.: 14/750,215

(22) Filed: Jun. 25, 2015

(65) Prior Publication Data

US 2015/0377119 A1     Dec. 31, 2015

(30) Foreign Application Priority Data

Jun. 30, 2014  (DE) .................. 10 2014 212 581

(51) Int. Cl.

| F02B 37/18 | (2006.01) |
| F16B 21/18 | (2006.01) |
| F16B 41/00 | (2006.01) |
| F16B 39/00 | (2006.01) |
| F02B 37/12 | (2006.01) |
| F02B 33/44 | (2006.01) |
| F16F 1/32  | (2006.01) |

(52) U.S. Cl.
CPC ............ *F02B 37/186* (2013.01); *F16F 1/324* (2013.01); *Y02T 10/144* (2013.01)

(58) Field of Classification Search
USPC .................................................. 411/525, 526
See application file for complete search history.

(56) References Cited

U.S. PATENT DOCUMENTS 9,243,549 B2 * 1/2016 Hinkelmann ......... F01D 17/105
9,464,565 B2 * 10/2016 Yamaguchi ........... F02B 37/183
9,784,179 B2 * 10/2017 Zieboll ................. F02B 37/186

FOREIGN PATENT DOCUMENTS

WO    WO-2013189575 A1 * 12/2013 ............ F02B 37/186

* cited by examiner

*Primary Examiner* — Matthieu F Setliff
*Assistant Examiner* — Douglas S Wood
(74) *Attorney, Agent, or Firm* — Eric L. Doyle; Stephan A. Pendorf; Patent Central LLC

(57) ABSTRACT

A control arrangement (9) of an exhaust-gas turbocharger (1), having a regulating unit (4) which has a regulating rod (5), and having a guide piece (6) which is connected to a free end region (8) of the regulating rod (5). The free end region (8) is connected to the guide piece (6) by way of a spring clip (10) which engages around the free end region (8) and which is clamped to the guide piece (6).

14 Claims, 4 Drawing Sheets

CONTROL ARRANGEMENT OF AN EXHAUST-GAS TURBOCHARGER

CROSS-REFERENCE TO RELATED APPLICATIONS

This application claims the benefit of German Patent Application No. 102014212581.2 filed Jun. 30, 2014, the disclosure of which is herein incorporated by reference in its entirety.

BACKGROUND OF THE INVENTION

Field of the Invention

The invention relates to a control arrangement of an exhaust-gas turbocharger.

Description of the Related Art

So-called "downsized engines" with high power-to-weight ratios have an increased tendency to vibrate, such that the components of an exhaust-gas turbocharger combined with such engines are subject to intense loading owing to vibrational friction wear. This wear also affects the components of control arrangements of such turbochargers, for example for the actuation of a wastegate flap. Here, even special materials for the stated components, with a wide variety of surface treatments, can reach their limits.

It is therefore an object of the present invention to provide a control arrangement of the type indicated in the preamble of claim 1, by means of which it is possible for vibrational friction wear of its components to be at least considerably minimized.

BRIEF SUMMARY OF THE INVENTION

In detail, said object is achieved by way of the control arrangement of an exhaust-gas turbocharger which has a regulating unit, for example in the form of a hydraulic control capsule, which is equipped with a regulating rod. The regulating rod has a free end region which is connected to a guide piece which is fastened for example to an outer lever which can be connected by way of a control shaft to a wastegate flap. According to the invention, the free end region of the regulating rod is connected to the guide piece by way of a spring clip. In this case, the spring clip engages around the free end region and is clamped to the guide piece.

Firstly, a simplified articulated and preloaded connection of the regulating rod to the guide piece is advantageously realized in this way. By means of the spring preload, it is possible for rattling noises in the natural frequency range to be prevented.

The dependent claims contain advantageous developments of the invention.

If the spring clip is equipped with two mutually spaced-apart spring rings which are connected to one another by means of a connecting bracket, this yields the advantage of a unipartite form of the spring clip, such that a resilient, articulated connection of the regulating rod to the guide piece can be realized using only a single installation means. This yields the advantage that said construction is logistically simple, as a smaller number of individual parts is required.

Furthermore, the advantage is attained that simple production of the spring clip in a punching and bending process is possible, with the external contour and the form of the spring rings being predefined at the same time.

If the spacing of the spring rings is equal to the material thickness of the free end region, this yields the advantage of engaged-around, clearance-free installation of the end region of the regulating rod.

If the spacing between the spring rings is variable owing to the design of the connecting bracket, this yields the advantage of the possibility of adaptation to tolerance deviations in the material thickness of the free end region.

If the spring rings each have spring tongues which are arranged along and fixed to the inner circumference of an outer ring, this yields the advantage that the spring tongues are more easily deformable for example than disk springs with closed circular contours, such that the upper spring clip as seen in the installed state, or the first spring clip, can be clamped to the guide piece without a plastic deformation threshold being reached, that is to say within the range of elastic deformation. At the same time, a spring preload in an axial direction is provided during operation, so as to eliminate a clearance and to eliminate rattling noises.

If the spring tongues project from the outer ring at an obtuse angle, this yields the advantage that a spring action and a support surface are provided, from which support surface the spring tongues extend radially inward.

If the spring tongues are arranged with uniform spacings to one another, this yields the advantage of a uniform force distribution.

If the spring tongues are separated from one another by recesses, this yields the advantage that a variable width of the spring elements is made possible, which in turn yields the advantage that manipulation of the spring stiffness in an axial direction is made possible.

If the spring rings are in each case of identical form, this yields the advantage of a uniform load or preload from bottom to top as viewed in the installed state.

If the connecting bracket has a bracket contour which is matched to the outer contours of the free end region, this yields the advantage of space-saving installation. Furthermore, no sharp-edged objects project from the free end region.

In a further particularly preferred embodiment, the lower spring ring as seen in the installed state, or the second spring ring, is supported on an abutment plate of the guide piece, whereas the first or upper spring ring is clamped to a bolt of the guide piece. This yields the advantage that, after the upper spring ring has been clamped, an axial preload is provided.

Furthermore, it is optionally possible for radial tabs to be provided on the connecting bracket, which yields the advantage that the guide piece can additionally be spring-loaded in the radial direction of its bolt.

Finally, it is possible for the material of the spring clip according to the invention to be provided with a surface coating (preferably in the form of a slide coating) in order to reduce the friction between the spring clip and the free end region, which furthermore leads to a reduction in hysteresis.

The material thickness of the spring clip preferably lies in a range from 0.1 mm to 0.3 mm, in particular 0.12 mm to 0.18 mm.

BRIEF DESCRIPTION OF THE SEVERAL VIEWS OF THE DRAWINGS

Further details, advantages and features of the present invention can be found in the following description of exemplary embodiments with reference to the drawing, in which.

DETAILED DESCRIPTION OF THE INVENTION

Figure 1:
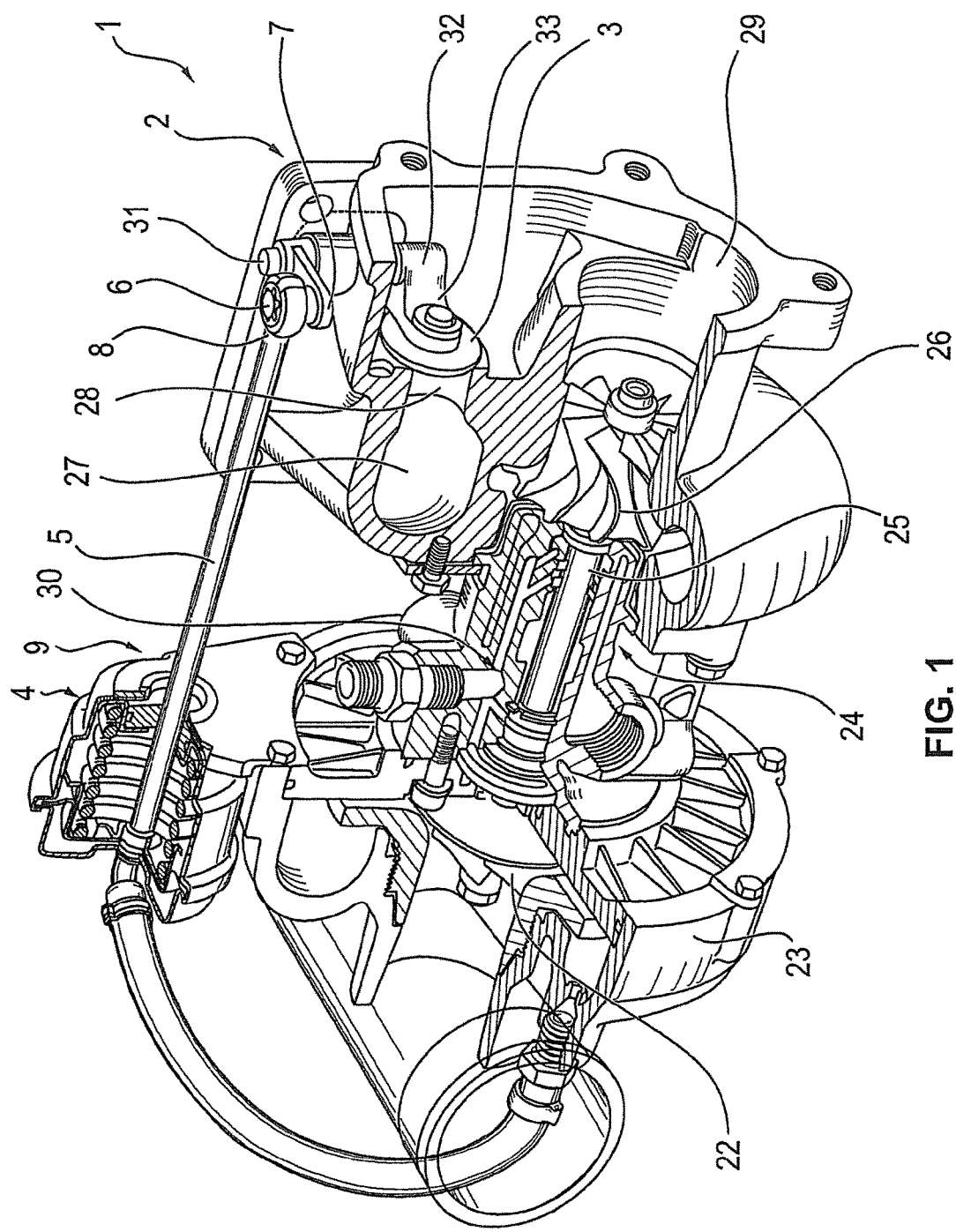
FIG. 1 shows a perspective sectional illustration of an exhaust-gas turbocharger according to the invention.

FIG. 1 shows an exhaust-gas turbocharger 1 according to the invention, which comprises a turbine housing 2. In the turbine housing 2 there is arranged a turbine wheel 26 which is arranged on one end of a charger shaft 25. The charger shaft 25 is mounted in a bearing housing 24, for which purpose said bearing housing normally comprises a radial bearing arrangement and an axial bearing arrangement. The bearing housing 24 furthermore has an oil supply device 30, and is connected to a compressor housing 23 in which a compressor wheel 22 is arranged. The compressor wheel 22 is fixed to the other end of the charger shaft 25.

The exhaust-gas turbocharger 1 furthermore has a regulating unit 4 as a component of a control arrangement 9. As shown in FIG. 1, the regulating unit 4 is, in the example, in the form of a pneumatic control capsule, though could also be in the form of an electric actuator.

The regulating unit 4 has a regulating rod 5 which comprises a free end region 8. The free end region 8 is connected to a guide piece 6. The guide piece 6 is fixed to an outer lever 7, which is connected to a control shaft 31 which is guided in the turbine housing 2. At its end region 32 arranged in the turbine housing 2, the control shaft 31 is connected to an inner lever 33. The inner lever 33 in turn is connected at its free end to a wastegate flap 3 which, by actuation by means of the regulating unit 4, can be pivoted between a closed position, shown in FIG. 1, and an open position. In the closed position, the wastegate flap 3 closes a bypass opening 28 which, in the open position of the wastegate flap 3, connects the turbine housing inlet 27 to the turbine housing outlet 29, in order that the turbine wheel 26 can be bypassed.

The free end region 8 of the regulating rod 5 is connected to the guide piece 6 by means of a spring clip 10 which engages around the free end region 8 and which is clamped to the guide piece 6, as will be described in detail below on the basis of the illustrations of FIGS. 2 and 3.

Figure 2:
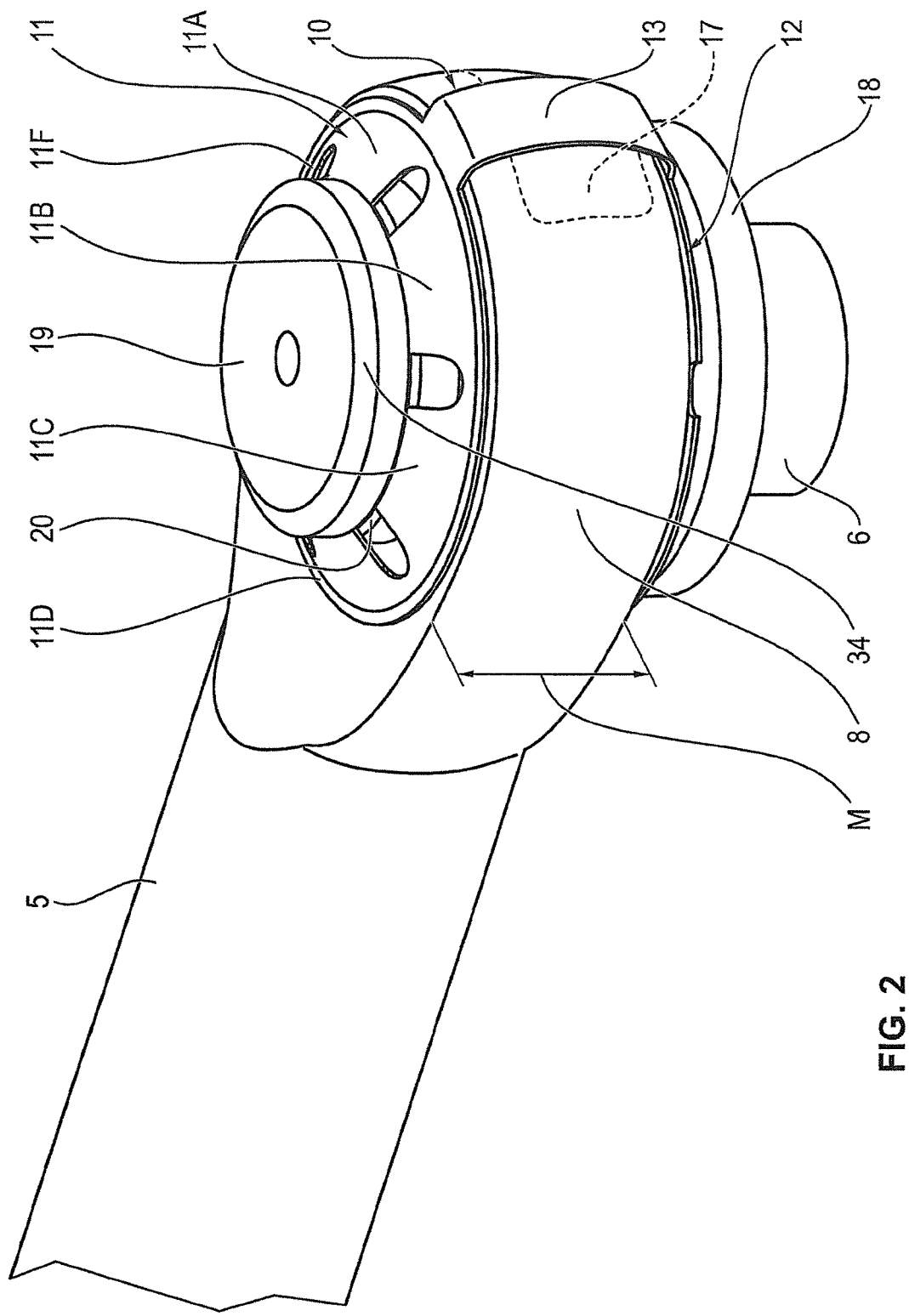
FIG. 2 shows a free end region of a regulating rod of the exhaust-gas turbocharger according to the invention in the state in which it is installed on a guide piece.

FIG. 2 is an enlarged illustration of the free end region 8 of the regulating rod 5. From this illustration, it can be clearly seen how the spring clip 10 engages around the free end region.

Figure 3:
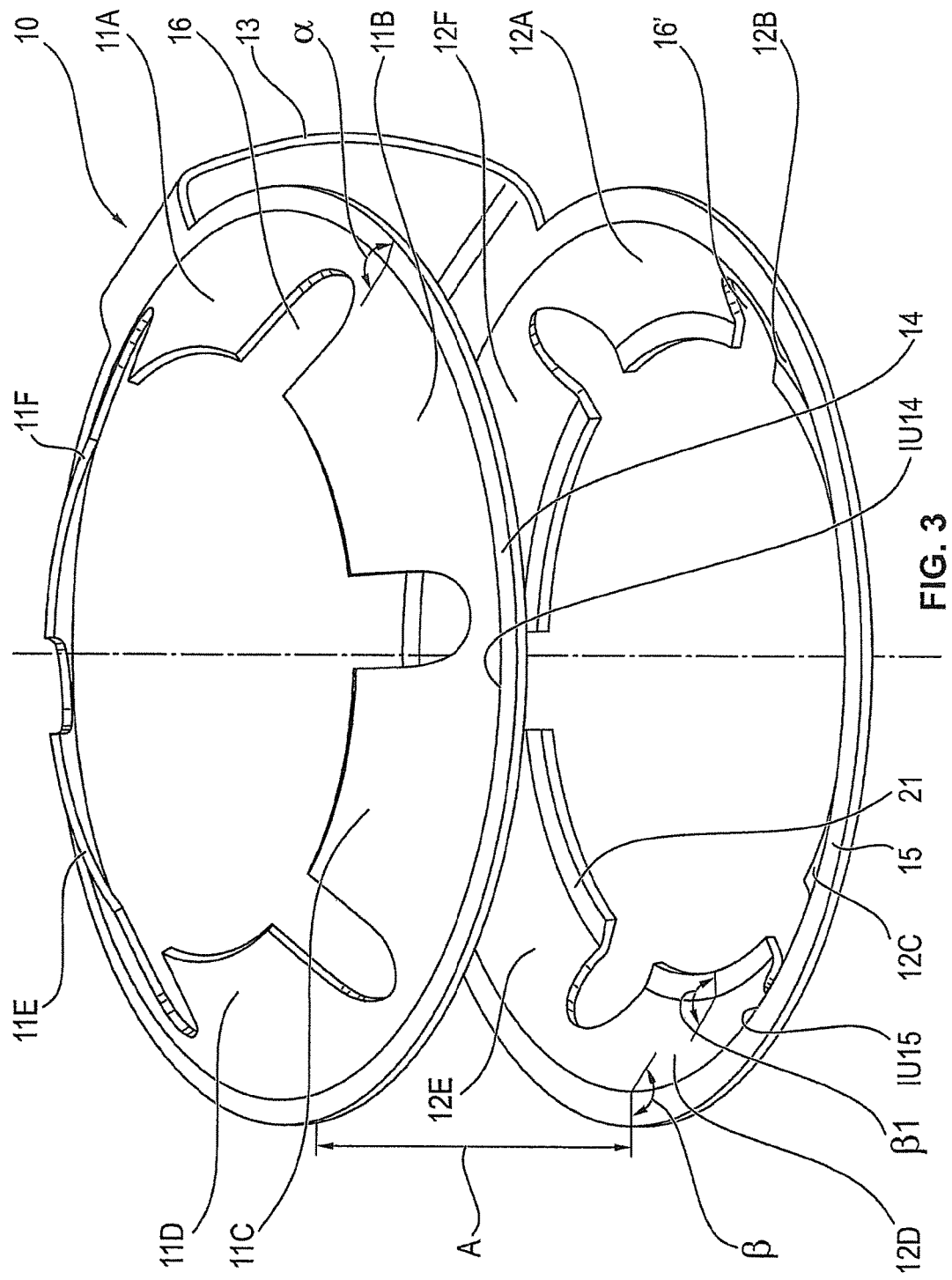
FIG. 3 is a perspective illustration of a spring clip according to the invention.

As can be seen viewing FIGS. 2 and 3 together, the spring clip in the particularly preferred embodiment illustrated in these figures has two spaced-apart spring rings 11 and 12 for this purpose. The spring rings 11 and 12 are connected to one another by means of a connecting bracket 13.

The spacing A, indicated in FIG. 3, between the spring rings 11 and 12 corresponds to the material thickness M, indicated in FIG. 2, of the free end region, which yields the advantage, mentioned in the introduction, of clearance-free installation of the free end region 8.

Said spacing A is advantageously variable owing to the design of the connecting bracket, such that adaptations to different contours and dimensions of the free end region 8 are possible.

As can be seen in detail from FIG. 3, the spring rings 11 and 12 each have spring tongues 11A to 11F and 12A to 12F respectively. This means that, in the particularly preferred embodiment illustrated in FIG. 3, the spring rings 11 and 12 each have six spring tongues.

The spring tongues 11A to 11F and 12A to 12F are arranged along and fixed to an inner circumference IU14 and IU15 respectively of an outer ring 14 and 15 respectively.

In this case, the spring tongues 11A to 11F and 12A to 12F each enclose an obtuse angle and □ respectively with the associated outer rings 14 and 15 respectively, said angles each being indicated in FIG. 3.

The lower spring ring 12 as seen in the installed state shown in FIG. 2, or the second spring ring 12, furthermore has an inner support edge 21 which is divided into support edge regions assigned to the spring tongues 12A to 12F, that is to say, in the example, comprises six support edge regions because six spring tongues 12A to 12F are provided.

In the particularly preferred embodiment illustrated in FIG. 3, the support edge 21 or its support edge regions each enclose an angle □1 with the associated spring tongues 12A to 12F. In the particularly preferred embodiment illustrated in FIG. 3, said angle □1 is equal to the angle □, such that the support edge 21 or the support edge regions thereof are arranged parallel to the outer ring 15.

The illustration of FIG. 3 furthermore clearly shows that the spring tongues 11A to 11F and 12A to 12F are each arranged with uniform spacings to one another.

In this case, in the embodiment illustrated in FIG. 3, the spring tongues 11A to 11F and 12A to 12F are each separated from one another by slots, that is to say six slots in the example, of which in each case one recess for the first spring ring 11, with the reference sign 16, and one recess for the second spring ring 12, with the reference sign 16', are indicated representatively for all of the slots.

As is also shown in FIG. 3, the spring rings 11 and 12 are of identical form in this embodiment.

FIG. 2 shows the installed state of the spring clip 10, in which it engages around the free end region 8 and in which the first spring ring 11 constitutes the upper spring ring, the spring tongues 11A to 11F of which engage into a groove 20 which is arranged between the guide piece 6 and a bolt 19 which is arranged on the upper end of the guide piece 6. Owing to the illustration selected in FIG. 2, of the spring tongues of the spring ring 11, only the spring tongue 11E is not visible, said spring tongue however likewise engaging into the groove 20 in the same way as the spring tongues 11A to 11F, as can be seen in detail from the illustration of FIG. 2.

FIG. 2 also shows that the connecting bracket 13 has a bracket contour matched to the outer contour of the free end region 8.

FIG. 2 also shows that the second spring ring 12, which is the lower spring ring in the installed state, is supported by way of its support edge 21 on a support plate 18 which is arranged on the guide piece 6.

Furthermore, the connecting bracket 13 may, as an optional feature, have radial tabs, of which a tab 17 is indicated by the dashed lines in FIG. 2. A second tab formed correspondingly to the tab 17 may be provided on the opposite side of the connecting bracket 13, said second tab however not being visible owing to the illustration selected in FIG. 2.

Figure 4A:
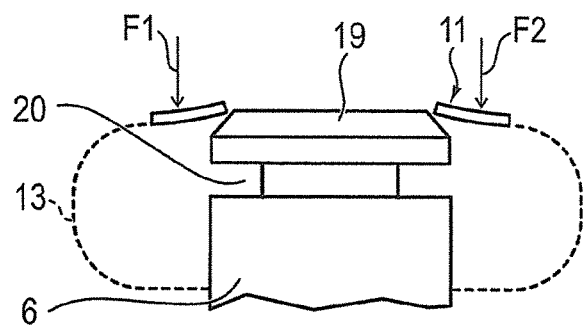
FIGS. 4a to 4d are schematically highly simplified illustrations of the spring clip according to the invention and of the guide piece, for the explanation of the installation method according to the invention.
Figure 4B:
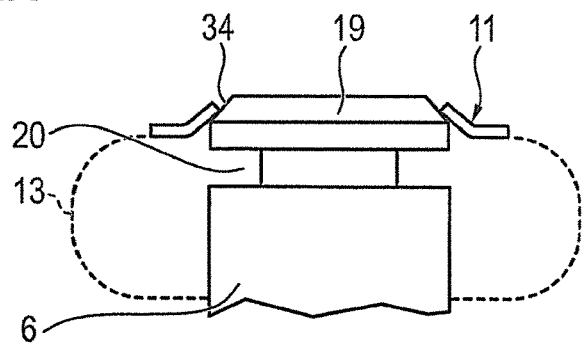
Figure 4C:
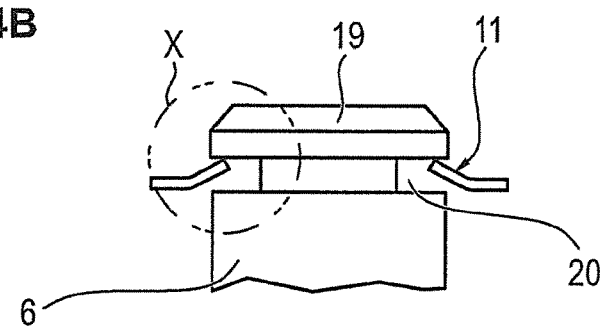
Figure 4D:
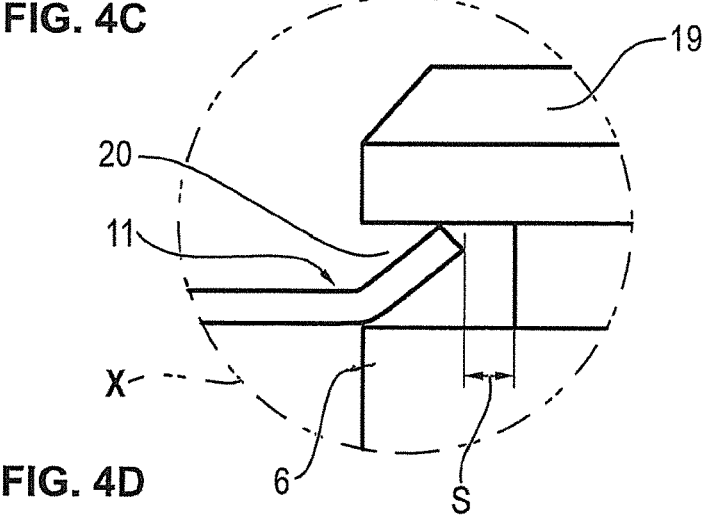

Below, the installation method according to the invention will be discussed on the basis of FIGS. 4A to 4D:

After the spring clip 10 has been produced, for example by way of a bending and punching process, the spring clip 10 is, whilst still in the flat state, mounted by way of its spring ring 12 onto the connecting piece 6. Subsequently, the connecting bracket 13, which is indicated by the dashed lines in FIGS. 4A and 4D, is bent upward as per the illustrations selected in FIGS. 4A and 4B, such that, as can be seen from FIG. 4A, the first or upper spring ring 11 is arranged above the bolt 19. In this state, a force symbolized in FIG. 4A by the arrows F1 and F2 is exerted on the upper spring ring 11 such that, as shown in FIG. 4B, the spring ring 11 is pushed onto the bolt 19, for which purpose said bolt preferably has a run-on bevel 34 in order to facilitate the installation process. As shown in FIG. 4C and the enlarged detail X illustrated in FIG. 4D, said action of force causes the upper spring ring 11 to be pushed by way of its spring tongues 11A to 11F into the groove 20, wherein said upper spring ring is deformed only elastically, that is to say not plastically, and can accordingly snap or engage elastically into the groove 20. Here, the spring ring 11, by way of its spring tongues 11A to 11F, assumes in each case a small clearance S with respect to the guide piece 6, such that the spring tongues 11A to 11F act only in the axial direction.

In addition to the above written disclosure, reference is hereby explicitly made, for supplementation thereof, to the diagrammatic illustration of the invention in FIGS. 1 to 4D.

LIST OF REFERENCE SIGNS

1 Exhaust-gas turbocharger
2 Turbine housing
3 Wastegate flap
4 Regulating unit
5 Regulating rod
6 Guide piece
7 Outer lever
8 Free end region
9 Control arrangement
10 Spring clip
11 First spring ring
12 Second spring ring
11A-11F Spring tongues of the first spring ring
12A-12F Spring tongues of the second spring ring
13 Connecting brackets
14, 15 Outer rings
16, 16' Slots
17 Radial bracket
18 Support plate
19 Bolt
20 Groove
21 Support edge
22 Compressor wheel
23 Compressor housing
24 Bearing housing
25 Charger shaft
26 Turbine wheel
27 Turbine housing inlet
28 Bypass opening
29 Turbine housing outlet
30 Oil supply device
31 Control shaft
32 Inner end
33 Inner lever
34 Run-on bevel
IU14, IU15 Inner circumference , □, □1 Angles
F1, F2 Force arrows
X Detail

The invention claimed is:

1. A control arrangement (9) of an exhaust-gas turbocharger (1), with
   a regulating unit (4) which has a regulating rod (5) having a free end with a bore extending between first and second surfaces, and
   a guide piece (6) which is inserted through the bore whereby a first guide piece part projects from the regulating rod first surface and a second guide piece part projects from the regulating rod second surface, the guide piece (6) connected to the free end region (8) of the regulating rod (5)
by way of a spring clip (10), wherein the spring clip (10) has mutually spaced-apart first and second spring rings (11, 12) which are connected to one another by means of a connecting bracket (13), wherein the first spring ring (11) is clamped to regulating rod first surface and the second spring ring (11) is clamped to regulating rod second surface to engage around the free end region (8) of the regulating rod (5) and which spring clip (10) first spring ring (11) engages the guide piece (6) first guide piece part projecting from the first surface and the second spring ring (12) engages the guide piece (6) second guide piece part projecting from the second surface,
   and
   wherein the first and second spring rings (11, 12) each have outer rings (14, 15) and spring tongues (11A-11F; 12A-12F) which are arranged along and fixed to the inner circumference (IU14; IU15) of one or the other of the outer rings (14, 15).

2. The control arrangement as claimed in claim 1, wherein the free end region (8) has a material thickness (M), and wherein the spacing (A) between the first and second spring rings (11, 12) corresponds to the material thickness (M) of the free end region (8).

3. The control arrangement as claimed in claim 2, wherein the first and second spring rings (11, 12) are flexibly attached to the connecting bracket (13) such that adaptation of the first and second spring rings (11, 12) to different contours and dimensions of the free end region (8) is possible.

4. The control arrangement as claimed in claim 1, wherein the spring tongues (11A-11F; 12A-12F) project from the outer ring (14, 15) at an obtuse angle (α; β).

5. The control arrangement as claimed in claim 1, wherein the spring tongues (11A-11F; 12A-12F) are arranged with uniform spacings to one another.

6. The control arrangement as claimed in claim 1, wherein the spring tongues (11A-11F; 12A-12F) are separated from one another by slots (16; 16').

7. The control arrangement as claimed in claim 1, wherein the first and second spring rings (11, 12) each have outer rings (14, 15) and spring tongues (11A-11F; 12A-12F) arranged along and fixed to the inner circumference (IU14; IU15) of the first and second outer rings (14, 15), wherein the number of spring tongues on the first outer ring is the same as the number of spring tongues on the second outer ring, and wherein the spring tongues on the first outer ring oppose the spring tongues on the second outer ring.

8. The control arrangement as claimed in claim 1, wherein the connecting bracket (13) has a bracket contour following the shape of the outer contour of the free end region (8).

9. The control arrangement as claimed in claim 1, wherein, in the installed state, one (12) of the first and second spring rings (11, 12) is supported on a support plate

(18) of the guide piece (6) and the other spring ring (11) is clamped to a bolt (19) of the guide piece (6).

10. The control arrangement as claimed in claim 9, wherein the spring clip (10) has radial tabs (17) to spring-load the spring clip (10) in the radial direction of its bolt.

11. The control arrangement as claimed in claim 1, wherein the spring clip (10) is provided with a surface coating.

12. The control arrangement as claimed in claim 1, wherein the material thickness of the spring clip (10) lies in a range from 0.1 mm to 0.3 mm.

13. The control arrangement as claimed in claim 1, wherein the material thickness of the spring clip (10) lies in a range from 0.12 mm to 0.18 mm.

14. An exhaust-gas turbocharger (1), a control arrangement (9) of a regulating unit (4) which has a regulating rod (5) having a free end with a bore extending between first and second surfaces, and
    a guide piece (6) which is inserted through the bore whereby a first guide piece part projects from the regulating rod first surface and a second guide piece part projects from the regulating rod second surface, the guide piece (6) connected to the free end region (8) of the regulating rod (5) by way of a spring clip (10), wherein the spring clip (10) has mutually spaced-apart first and second spring rings (11, 12) which are connected to one another by means of a connecting bracket (13), wherein the first spring ring (11) is clamped to regulating rod first surface and the second spring ring (11) is clamped to regulating rod second surface to engage around the free end region (8) of the regulating rod (5) and which spring clip (10) first spring ring (11) engages the guide piece (6) first guide piece part projecting from the first surface and the second spring ring (12) engages the guide piece (6) second guide piece part projecting from the second surface,
and
wherein the first and second spring rings (11, 12) each have outer rings (14, 15) and spring tongues (11A-11F; 12A-12F) which are arranged along and fixed to the inner circumference (IU14; IU15) of one or the other of the outer rings (14, 15).

\* \* \* \* \*